(12) United States Patent
Braun et al.

(10) Patent No.: US 6,923,484 B2
(45) Date of Patent: Aug. 2, 2005

(54) FLANGE CONNECTION BETWEEN A LONGITUDINAL BEAM OF A VEHICLE AND A CARRIER ELEMENT THAT CAN BE MOUNTED TO IT

(75) Inventors: Dieter Braun, Rheda-Wiedenbrück (DE); Cornelia Wiehen, Geseke (DE); Robert Raulf, Lippstadt (DE)

(73) Assignee: Hella-Behr Fahrzeugsysteme, Lippstadt (DE)

( * ) Notice: Subject to any disclaimer, the term of this patent is extended or adjusted under 35 U.S.C. 154(b) by 0 days.

(21) Appl. No.: 10/762,591

(22) Filed: Jan. 22, 2004

(65) Prior Publication Data

US 2004/0169382 A1 Sep. 2, 2004

(30) Foreign Application Priority Data

Jan. 23, 2003 (DE) .......................................... 103 02 534

(51) Int. Cl.[7] .............................................. B60R 19/04
(52) U.S. Cl. ........................ 293/155; 293/154; 293/132; 293/133; 296/29; 296/187.09; 403/338
(58) Field of Search ................................. 293/154, 155, 293/133, 132; 296/203.02, 29, 187.09, 187.11; 403/335, 336, 337, 338

(56) References Cited

U.S. PATENT DOCUMENTS 4,721,333 A * 1/1988 Morio ......................... 293/146
6,334,638 B1 * 1/2002 Yamamuro et al. ......... 293/133
6,698,968 B2 * 3/2004 Kajiwna et al. ............ 403/337
6,814,381 B1 * 11/2004 Frank ......................... 293/133

FOREIGN PATENT DOCUMENTS

DE          19854050    *  5/2000
EP           0721878    *  7/1996

* cited by examiner

Primary Examiner—Joseph D. Pape
(74) Attorney, Agent, or Firm—Bourque & Assoc.

(57) ABSTRACT

A flange connection between a longitudinal beam of a vehicle as a first component and a carrier element, which can be mounted to it, as a second component, whereby a flange plate operatively mounted to either the first or second component and a counter flange plate operatively mounted to the other of the first or second component. To hold the flange plate tight to the counter flange plate, a wedge effect is used. A connection bolt having a wedge slope protrudes from the flange plate, wherein the wedge slope extends in a cross direction. The counter flange plate has a feed-through opening for the connection bolt, and wherein a locking component is placed at its inner side. In the connected position, the locking component surrounds the locking bolt and establishes a wedge surface that interacts with its wedge slope. Furthermore, the locking component exhibits at a side opposite the wedge surface, a clamping screw that can be tightened against the connection bolt.

13 Claims, 5 Drawing Sheets

FLANGE CONNECTION BETWEEN A LONGITUDINAL BEAM OF A VEHICLE AND A CARRIER ELEMENT THAT CAN BE MOUNTED TO IT

TECHNICAL FIELD OF THE INVENTION

The invention relates to a flange connection and more particularly, to a flange connection between a longitudinal beam of a vehicle and a carrier element that can be mounted to it.

DESCRIPTION OF THE RELATED ART

DE 198 54 050 A1 discloses a flange connection, a threaded bolt, exhibiting nuts that rest on the inner sides of the flange plate and the counter flange plate. The exhibiting nuts are screwed onto both sides of said bolt, and penetrate the flange plate and the counter flange plate. The threaded connection separates the connected components from one another, even if the nut that is located in the driving direction in the front is no longer accessible due to damage.

There are other known connections of vehicle components that can be separated that do not include flange plates. For example, EP 0 721 878 B1 describes an assembly connection that exhibits connection profiles that engage each other in a hook-like manner and with a clamping screw securing the positive fit.

SUMMARY OF THE INVENTION

It is an aspect of the present invention to provide a flange connection, wherein the flange plate and the counter flange plate can be held tight to one another via positively engaging connection elements that can be separated from one another.

This one aspect of the present invention is achieved with a flange connection between a face end of a longitudinal beam of a vehicle as a first component, and a carrier element mounted to it in its longitudinal direction, as a second component, whereby a flange plate having an outer side is operatively mounted to either the first or second component and a counter flange plate having an outer side operatively mounted to the other of the first or second component, and wherein the outer side of the flange plate and the outer side of the counter flange plate are held tight and in contact to each other, said flange connection comprising a connection bolt having a wedge slope, and wherein a first end of the connection bolt protrudes from the outer side of the flange plate, wherein the wedge slope extends in the cross direction of said connection bolt from an upper edge at an upper side of the connection bolt in a direction toward the flange plate, such that the counter flange plate exhibits, at the flange plate, a feed-through opening for receiving the connection bolt, and wherein a locking component is placed on an inner side of the counter flange plate, wherein in a connected position, said locking component having a wedge surface surrounds the connection bolt and said wedge surface is received by the wedge slope; and a clamping screw that can be tightened against the connection bolt.

Another aspect of the present invention is that the flange plate and the counter flange plate are held tight to one another using a wedge connection that includes a movable element, and the locking component, which moves in one plane that is parallel to the flange plane for the purpose of tightening and loosening the flange connection. The required actuation of the clamping screw, which is tightened against the connection bolt, can be accomplished from a direction that is not the same as the longitudinal direction of the longitudinal beam of the vehicle and the carrier element that may be mounted to it, which improves the accessibility to the clamping screw even when in damaged condition. In addition, the movability of the flange plate and the counter flange plate with respect to each other can be easily accomplished by making the play, around the connection bolt in the feed-through opening of the counter flange plate, sufficiently large and by providing the locking component with sufficient play for moving at the inner side of the counter flange plate. This provides a tolerance balance for the vehicle components arranged at the carrier element through an adjustment relative to the longitudinal beam of the vehicle in the cross direction of the vehicle, the y-direction as well as in the height direction of the vehicle, the z-direction.

Advantageous design features of the invention are described herein.

BRIEF DESCRIPTION OF THE DRAWINGS

These and other features and advantages of the present invention will be better understood by reading the following detailed description, taken together with the drawing wherein.

DETAILED DESCRIPTION OF THE PREFERRED EMBODIMENTS

Figure 1:
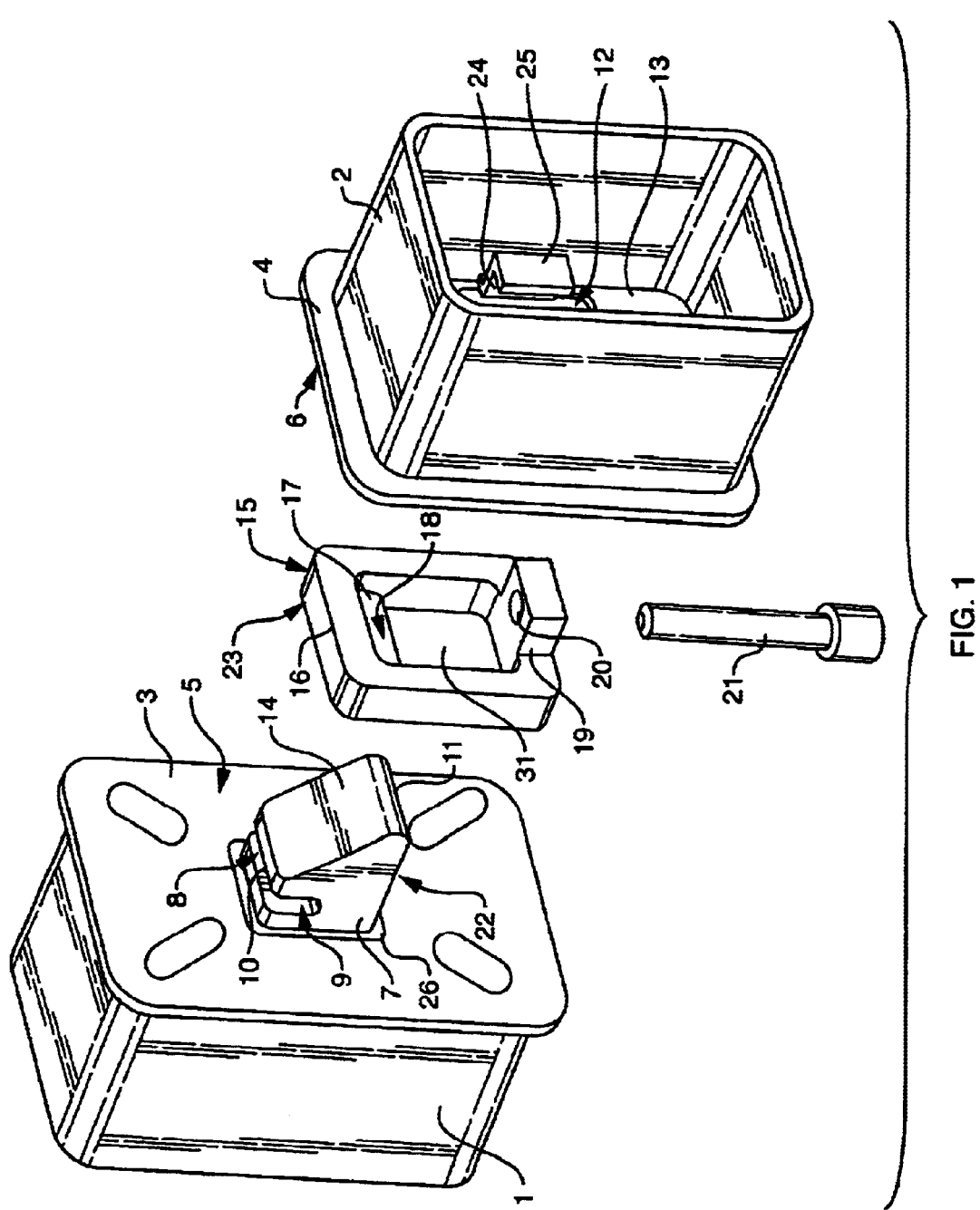
FIG. 1 is a perspective exploded view of a flange connection according to the present invention.
Figure 2:
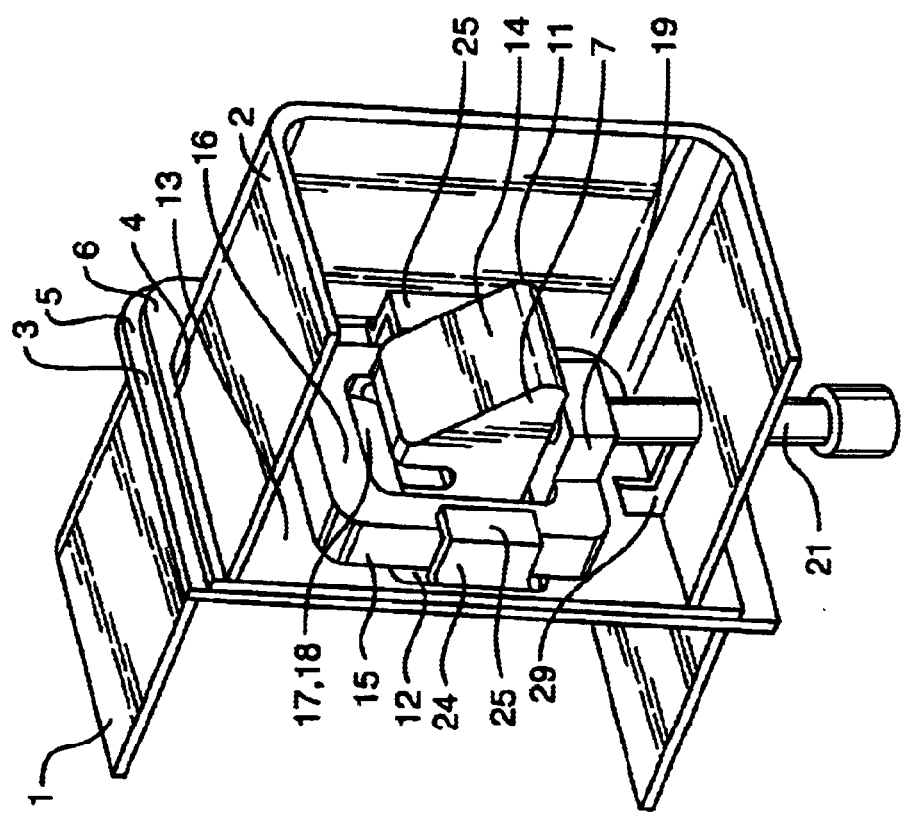
FIG. 2 is a perspective, sectional view of the flange connection according to FIG. 1 in a connected position.
Figure 4:
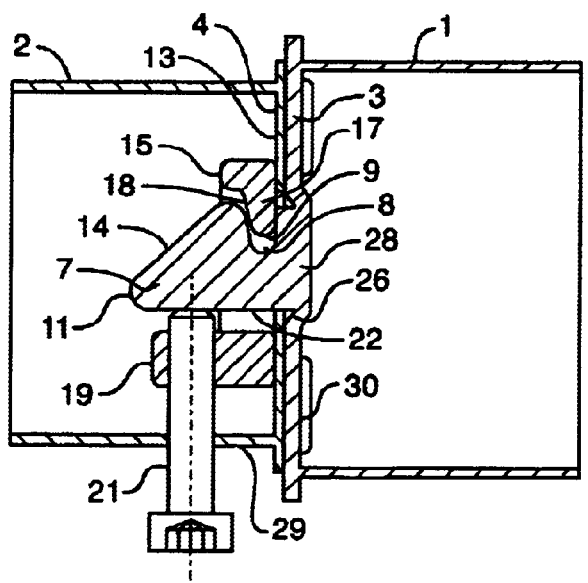
FIG. 4 is a longitudinal sectional view through the flange connection in the connected position according to the present invention.

FIG. 1 shows a section of a vehicle-component 1, which is a front end of a longitudinal beam of the vehicle. A second component 2, which is a carrier element for vehicle attachments, is operatively mounted to component 1 in the extension of its longitudinal direction and which, in a preferred embodiment, constitutes a crash box. A flange plate 3 is operatively mounted to a face side of the component 1. Similarly, a fixed mounted counter flange plate 4 is found at or operatively mounted to a rear face side of the second component 2. The flange plate 3 and counter flange plate 4 can be held tight to one another for the purpose of connecting the two components 1 and 2, whereby an outer side 5 of the flange plate 3 rests on an outer side 6 of the counter flange plate 4. The connected position of the entire flange connection is shown in FIGS. 2 and 4.

A connection bolt 7 is positively connected to flange plate 3 and protrudes from the outer side 5 of the flange plate 3 of the component 1. In the preferred embodiment, the connection bolt 7 is positioned centrally at the flange plate 3 and is surrounded by a bead 26 that is embossed from the outer side 5 of the flange plate 3 and that allows minimal longitudinal adjustment of the connection bolt 7 relative to the flange plate 3. The connection bolt 7 has a longitudinal direction oriented orthogonal to the plane of the flange plate 3.

The connection bolt 7 may have any kind of cross-section, even a round cross-section. In the preferred embodiment, the connection bolt 7 has a rectangular or square cross-section, which, among other things, provides for a large-area support slope 14 that stretches or extends across the entire bolt cross-section at the front, free end 11 of the connection bolt 7. Proximate the flange plate 3, a transverse groove 8 is molded into the connection bolt 7, essentially perpendicular to its longitudinal direction, and stretches or extends, therefore, in the direction of a radial plane of the connection bolt 7. The transverse groove 8 exhibits an upper edge 10 located at the outer side of the connection bolt 7 and runs along one of the straight rectangular or square sides of the bolt cross-section.

The flank of the transverse groove 8 that is farther away from the flange plate 3 forms a wedge slope 9. The wedge slope 9 slants from the upper edge 10 of the transverse groove 8 that is oriented in the direction of the free end 11 of the connection bolt 7 towards the groove root in the direction of the flange plate 3 or away from the free end 11 of the connection bolt 7. On the side of the connection bolt 7 that is located opposite the transverse groove 8, a contact surface 22 is formed due to the rectangular or square cross-section. The function of said contact surface is discussed herein.

Figure 5:
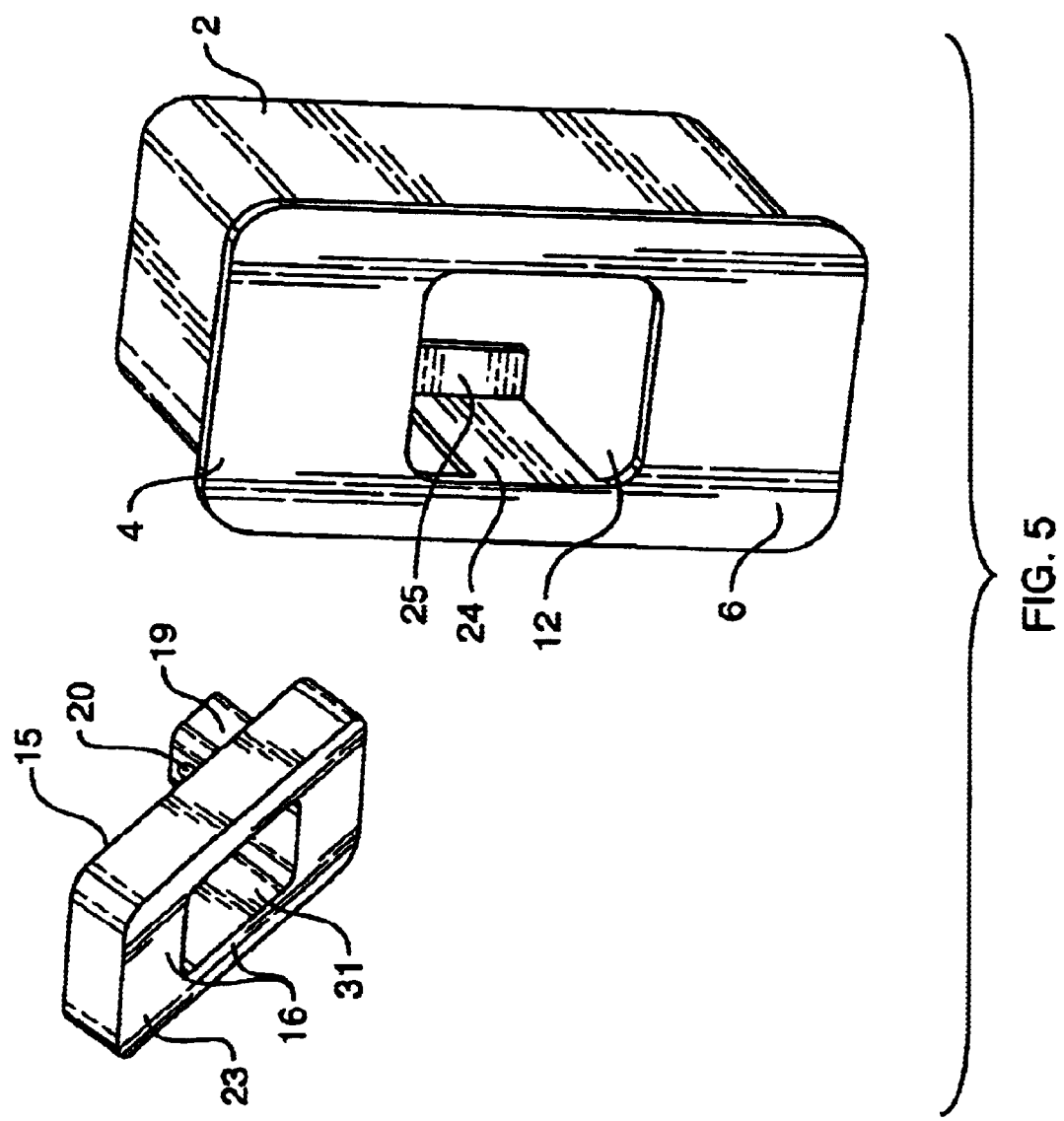
FIG. 5 is perspective view of the counter flange plate and the locking component prior to assembly through the feed-through opening of the counter flange plate according to the present invention.

In the connected position of the flange connection, the connection bolt 7 at the flange plate 3 passes through the counter flange plate 4 of the component 2 as shown in FIGS. 2 and 4. For this purpose, a feed-through opening 12 is provided in the counter flange plate 4 as shown in FIG. 5. Although the feed-through opening 12 in the counter flange plate 4 has a basic shape that is adapted to the cross-sectional shape of the connection bolt 7, the width of the feed-through opening 12 is greater than required for the passage of the connection bolt 7 as shown in FIG. 4. In that way, the counter flange plate 4 rests on the flange plate 3, and said counter flange plate 4 can move in relation to the flange plate 3 in all radial directions of the connection bolt 7 by a specified play, which will not be obstructed as long as the connection bolt 7 does not strike the edge of the feed-through opening 12 in the counter flange plate 4. If the outer side 5 of the flange plate 3 rests on the outer side 6 of counter flange plate 4, the transverse groove 8 at the connection bolt 7 will be located with its wedge slope 9 in front of the inner side 13 of the counter flange plate 4, whereby the wedge slope 9 will be at a distance from the inner side 13 of the counter flange plate 4 as shown in FIG. 4.

Securing the flange connection in the connected position is carried out via a locking element 15 that interacts with the connection bolt 7. The locking component 15 is a ring-shaped object and a closed ring in the shape of a rectangle or square, which features ring sections 16 that run in a straight direction as shown in FIG. 1. FIG. 2 shows the flange connection in the connected position, wherein the ring-shaped locking component 15 surrounds the connection bolt 7 that protrudes through the counter flange plate 4, which requires that the locking component 15 be brought to the inner side 13 of the counter flange plate 4. The ring opening 31 of the locking component 15 must be sufficiently large for the connection bolt 7 to pass through.

At the straight ring section 16 of the locking component 15 that rests, in the locked position, at that side of the connection bolt 7, where its transverse groove 8 is located, a bridge 17 is formed longitudinally on the inner side, and a wedge surface 18 is formed there. The wedge surface 18 is located at that side of the bridge 17 that, in the connected position of the wedge slope 9, is facing the transverse groove 8 at the connection bolt 7; furthermore, the slope angle of the wedge surface 18 corresponds to this wedge slope 9. In the connected position, the locking component 15 is held loosely at the inner side 13 of the counter flange plate 4 with the bridge 17 and engages with the transverse groove 8 of the connection bolt 7 at the flange plate 3 such that the bridge 17 dips into the transverse groove 8, whereby the wedge surface 18 of the locking component 15 and the wedge slope 9 at the connection bolt 7 come to rest against each other. Due to the wedge effect, a force acts in the axial direction of the connection bolt 7 upon the locking component 15, whereby the contact side 23 of the locking component 15 comes into solid contact with the inner side 13 of the counter flange plate 4. Conversely, due to the wedge effect, an axial tensile force acts upon the connection bolt 7, thereby pulling the flange plate 3 against the counter flange plate 4. As FIG. 4 illustrates, the depth of the transverse groove 8 at the connection bolt 7, and thus the engagement length of its wedge slope 9, on the one hand, as well as the engagement length of the wedge surface 18 at the bridge 17 of the locking component 15, on the other hand, are dimensioned sufficiently, such that at the intended tight contact of the flange plate 3 with the counter flange plate 4, and the free edge of bridge 17 of the locking component 15 does not come to rest at the root of the transverse groove 8 of the connection bolt 7.

A clamping screw 21 is provided at the locking component 15 so that in the engagement position of bridge 17 at the locking component 15 with the transverse groove 8 of the locking bolt 7, a tight contact can be provided through additional wedging. This clamping screw 21 is situated in a threaded hole 20, which is located in a console 19 at the locking component 15. The console 19 is placed at the side of the locking component that is located opposite of the bridge 17 and protrudes at the opposite side from the contact side 23 of the ring-shaped object. As shown in FIGS. 2 and 4, in the locked position, the clamping screw 21 rests at the contact surface 22 of the connection bolt 7, thus, tightening the tension screw 21 against the connection bolt 7 will pull the locking component 15 with its bridge 17 into the transverse groove 8 at the connection bolt 7, wherein the flange plate 3 and the counter flange plate 4 are held together tightly due to the wedge effect.

An adjustment of the component 2 in relation to the component 1 can be carried out in the direction of the flange plane, before the tensioning is so strong that the flange plate 3 and the counter flange plate 4 are friction-interlocked. Not only can the connection bolt 7 move inside the feed-through opening 12 of the counter flange plate 4, but also, the locking component too is initially held loosely to the inner side 13 of the counter flange plate 4. This is facilitated by support lugs 24 that follow the side edges of the feed-through opening 12. The support lugs 24 are shaped from the piece of material that is released when stamping the feed-through opening 12 into the counter flange plate 4. The support lugs 24 protrude beyond the inner side 13 of the counter flange plate 4, and stretch towards it in a perpendicular direction. At their free ends, they feature angled bars 25 that reach behind the locking component 15, which is located at the inner side 13 of the counter flange plate 4. Using these bars 25, the locking component 15 is held sufficiently loose, such that it can be moved parallel to the plane of the inner side 13 of the counter flange plate 4, as long as the tight contact caused through the locking component 15 is not so strong that it inhibits such a movement.

Figure 3:
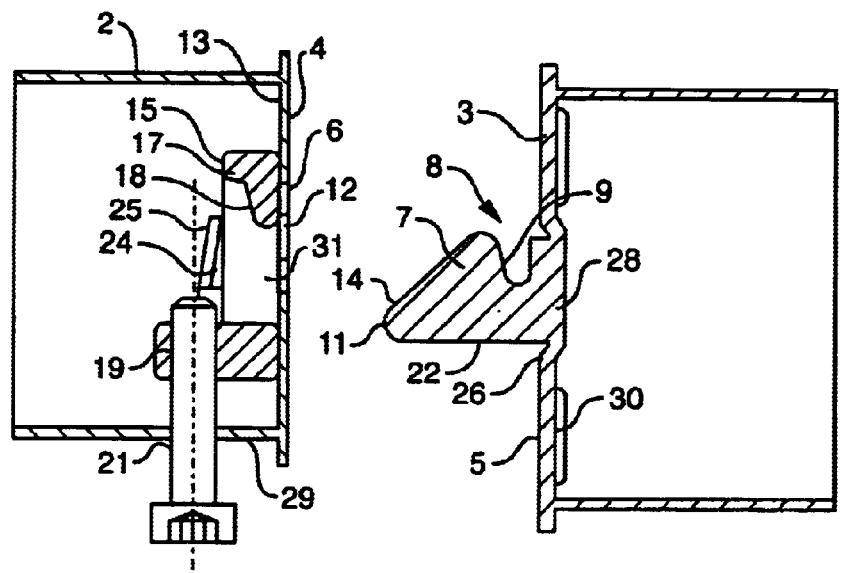
FIG. 3 is a longitudinal sectional view through the flange connection prior to the flange plate and the counter flange plate being joined together according to the present invention.

The bead 26 is embossed into the flange plate 3 and surrounds the connection bolt 7 as shown in FIGS. 1, 3 and 4. Because of the bead 26, the flange plate 3 has a mounting area 28 for the connection bolt 7, with the mounting area protruding beyond the inner side 30 of the flange plate 3. In addition, a feed-through opening 29 is located at component 2 and provides for the attachment of the clamping screw 21 as shown in FIGS. 3, 4, 6 and 7. In the connected position, the clamping screw 21 is located in the radial direction to the connection bolt 7 and, preferably, protrudes through the feed-through opening 29, in order to actuate it from the outer side of component 2. In this manner, not only holding together but also loosening of the two components 1 and 2 from one another is possible through access from the side. This is particularly advantageous for the component 2, which is designed as a crash box, should it deform in a head-on collision of the vehicle.

Figure 7:
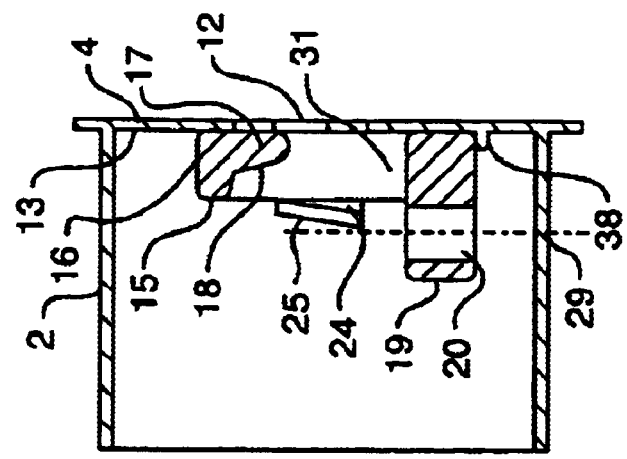
FIG. 7 is a longitudinal section view through the counter flange plate and the component according to FIG. 5 with the locking component having transitioned to an end position.
Figure 6:
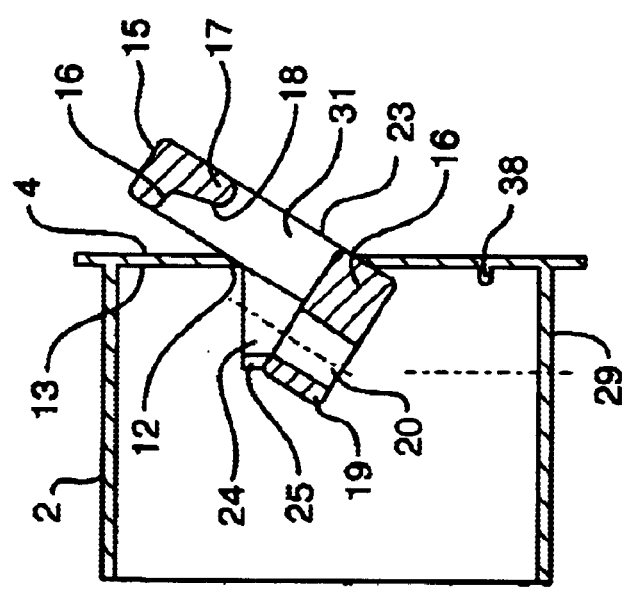
FIG. 6 is a longitudinal section view through the counter flange plate and the component according to FIG. 5 in a partially passed through position.

FIGS. 5-7 show the feature that the locking component 15 is inserted from the outer side 6 of the counter flange plate 4 through the feed-through opening 12 into the inner side of component 2, allowing component 2 to have a closed design with the exception of the feed-through opening 29. In the width direction, the feed-through opening 12 has a width that is slightly greater than the outer width of the locking component 15. On the other hand, the height of the feed-through opening 12 is smaller than the overall height of the locking component 15. Thus, in the connected position, the locking component 15 rests on the inner side 14 of the counter flange plate 4 with its upper and lower ring sections 16.

FIGS. 5 and 6 show the locking component 15 inserted in a slanted position through the feed-through opening 12 of the counter flange plate 4. After the locking component 15 has entirely passed through the feed-through opening 12, it is brought into an upright position. Thereafter, the locking component 15 can move upwards in order to bring it with its contact side 23 in contact with-the inner side 13 of the counter flange plate 4. A tappet 38, where the bottom side of the locking component can be placed, is present underneath the support lugs 24. Furthermore, the angled bridges 25 of the support lugs 24 exhibit a slope such that the distance from the inner side 13 of the counter flange plate 4 increases in the downward direction. This enables the insertion of the locking component 15 into the inner space of component 2 in the shown slanted position. Further, in the pushed upwards and upright position, the locking component 15 is held so close to the inner side 13 of the counter flange plate 4, such that after the tappet 38 is placed, it cannot slip off. The tappet 38 does not obstruct the tight hold position of the locking component 15, which is moved upwards by the connection bolt 7, which passes through when the flange connection is established, due to the sliding slope on its face side.

Thus, the present invention provides novel, useful and non-obvious flange connection between a longitudinal beam of a vehicle, as a first component, and a carrier element, which can be mounted to it, as a second component as described in greater detailed herein.

Modifications and and substitutions by one of ordinary skill in the art are considered to be within the scope of the present invention, which is not to be limited except by the claims which follow.

What is claimed is:

1. A flange connection between a face end of a longitudinal beam of a vehicle as a first component, and a carrier element mounted to said face end of a longitudinal beam, as a second component, whereby a flange plate having an outer side is operatively mounted to either the first or second component and a counter flange plate having an outer side operatively mounted to the other of the first or second component, and wherein the outer side of the flange plate and the outer side of the counter flange plate are held tight and in contact to each other, said flange connection comprising:

a connection bolt having a wedge slope, and wherein a first end of the connection bolt protrudes from the outer side of the flange plate, wherein the wedge slope extends in a cross direction of said connection bolt from an upper edge at an upper side of the connection bolt in a direction toward the flange plate, and wherein the counter flange plate exhibits, a feed-through opening for receiving the connection bolt, and wherein a locking component is placed on an inner side of the counter flange plate, wherein in a connected position, said locking component having a wedge surface surrounds the connection bolt and said wedge surface is received by the wedge slope; and a clamping screw that can be tightened against the connection bolt.

2. The flange connection as set forth in claim 1, wherein the connection bolt is arranged centrally at the flange plate.

3. The flange connection as set forth in claim 1, wherein the connection bolt exhibits a transverse groove formed into the connection bolt in a radial direction, with a flank of the groove positioned away from the flange plate forming the wedge slope.

4. The flange connection as set forth in claim 1, wherein the connection bolt exhibits a square or rectangular cross-section, wherein the connection bolt has side surfaces, and wherein one of the side surfaces of the connection bolt forms a contact surface for the clamping screw, and wherein the wedge slope is located at the side of the connection bolt that is opposite the contact surface.

5. The flange connection as set forth in claim 1, wherein the locking component has the shape of a closed ring.

6. The flange connection as set forth in claim 5, wherein the locking component has the shape of a rectangular ring having one or more straight ring sections, wherein the wedge surface is located at a longitudinal bridge at an inner side of one of the straight ring sections.

7. The flange connection as set forth in claim 1, further including: a protruding console having a threaded hole that receives the clamping screw, the protruding console integrally formed with the locking component at a side opposite from a contact side of the locking component.

8. The flange connection as set forth in claim 1, wherein a width of the feed-through opening in the counter flange plate is greater than a diameter of the connection bolt, and wherein the locking component is held proximate the counter flange plate in a movable fashion parallel to the inner side.

9. The flange connection as set forth in claim 8, wherein at the inner side of the counter flange plate, support lugs are arranged and protrude from the inner side and extend behind the locking component, and wherein play necessary for movement is provided between said support lugs and the locking component.

10. The flange connection as set forth in claim 1 wherein the feed-through opening of the counter flange plate has a width for guiding the locking component through, in a position different from the connected position.

11. The flange connection as set forth in claim 10, wherein the feed-through opening of the counter flange plate is square or rectangular, whereby the width of the feed-through opening in one of the longitudinal or cross directions or in one of the diagonal directions is greater than the outer width of the locking component.

12. The flange connection as set forth in claim 1 wherein the connection bolt is operatively mounted to the flange plate and further including a bead arranged around the connection bolt and wherein the bead is embossed from the outer side of the flange plate, forming a mounting area protruding beyond the inner side of the flange plate.

13. The flange connection as set forth in claim 1, wherein the clamping screw of the locking component, which can be tightened against the connection bolt, is accessible from the outer side in an axial direction at the respective component.

* * * * *